April 28, 1925.
J. B. BATES
1,535,286
BALANCE ESCAPEMENT
Filed April 30, 1923
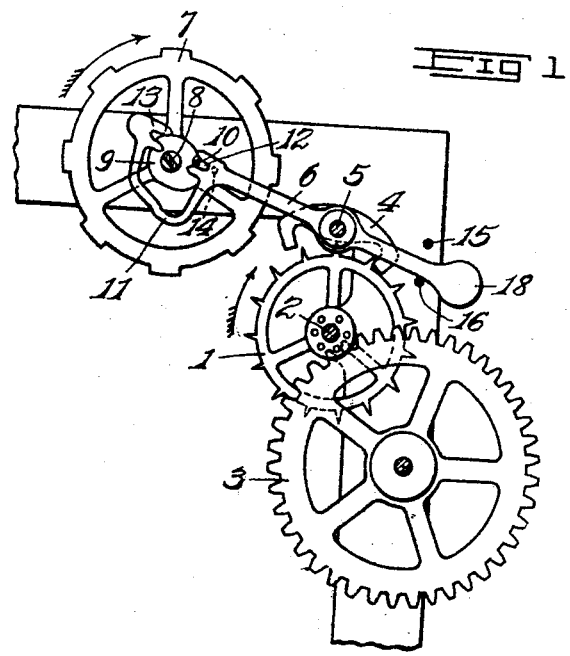
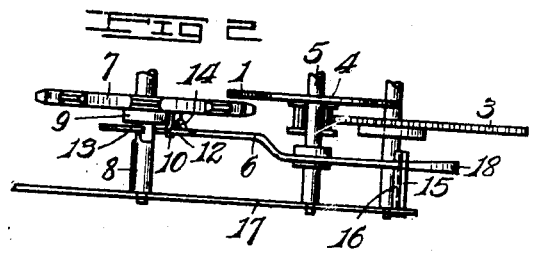
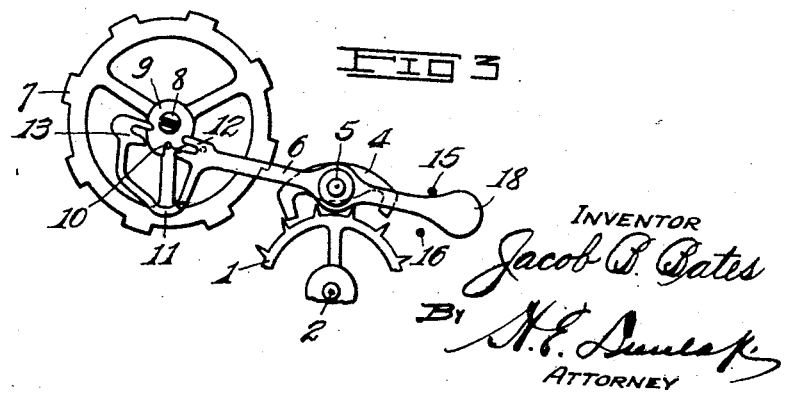
INVENTOR
Jacob B. Bates
By N. E. Dunlap
ATTORNEY Patented Apr. 28, 1925.

1,535,286

UNITED STATES PATENT OFFICE.

JACOB B. BATES, OF CAMBRIDGE, OHIO, ASSIGNOR OF ONE-HALF TO W. N. BRADFORD, OF CAMBRIDGE, OHIO.

BALANCE ESCAPEMENT.

Application filed April 30, 1923. Serial No. 635,441.

*To all whom it may concern:*

Be it known that I, JACOB B. BATES, a citizen of the United States of America, and resident of Cambridge, county of Guernsey, and State of Ohio, have invented certain new and useful Improvements in Balance Escapements, of which the following is a specification.

This invention relates broadly to escapements for watches and clocks, and more specifically to a springless balance-wheel escapement for such timepieces.

The primary object of the invention is to provide a structurally improved and simplified balance escapement for timepieces, in which the employment of a hair spring with its attendant objectionable features or disadvantages is dispensed with.

A further object is to provide a mechanism of the character mentioned in which the balance wheel is continuously rotated at a uniform rate of speed, thereby practically eliminating the vibration which is incident to the oscillatory movements of balance wheels having hair springs associated therewith, as ordinarily.

A still further object within the contemplation of the invention is to provide an escapement which, due to the fact that lighter power impulses are required in its operation, may be driven by a relatively light and narrow mainspring.

With these and other objects in view, the invention resides in the features of construction which will hereinafter be exemplified, reference being had to the accompanying drawings, in which—

Figure 1 is a side elevation of an escapement embodying my invention;

Figure 2 is a top plan view of the same; and

Figure 3 is a view similar to Fig. 1, showing the impulse lever at the limit of its movement opposite that shown in Fig. 1.

Referring to said drawings, 1 indicates the escape wheel of a clock mechanism, the same being carried by a staff 2 driven in the usual manner through a gear wheel 3 which forms a part of the usual gear train. Disposed in operative relation to said escape wheel 1 is a pallet 4 carried by a rock shaft 5, as ordinarily. Fixed on said rock shaft for oscillation in unison with said pallet 4 is an impulse lever 6 which is adapted to impart to a balance wheel 7 two separate and distinct impulses at diametrically opposite points in each revolution of said balance wheel for continuously rotating the latter.

The balance wheel is carried by a balance staff 8 upon which is also mounted a banking collet or roller table 9 of cam-like form carrying an eccentrically located jewel pin 10.

The inner end of the lever 6 is shaped to form a yoke 11 of approximately U-shape which has its opposite side members disposed at substantially right angles to the body of said lever. Formed on the inner end of said lever body is a small outwardly facing fork 12 which is adapted to operatively engage the jewel pin 10 during a part of each revolution of the collet; and formed on the free end of the yoke 11 is a similar fork 13 which occupies a position in substantially alined and facing relation to said fork 12 and which is adapted during another part of each revolution of the collet to operatively engage the jewel pin 10.

An unbanking pin 14 is carried by the lever 6 at one side of its inner end, the same being designed to coact with the collet 9 during apart of each revolution of the latter for supporting said inner end against movement during the interval between the impulse movement of said lever and the engagement of the jewel pin 10 with the fork opposite that through which said impulse movement is imparted.

In practice, the energy of the mainspring (not shown) acts through the gear wheel 3 for imparting forward rotating movement to the staff 2 and the escape wheel 1 immediately following the release of a tooth of the latter by the pallet 4. In Fig. 1 the parts are disposed in the positions assumed just prior to the release of a tooth of the escape wheel by the outer end pawl of the pallet, at which time the collet-carried jewel pin 10 has just entered the inner fork 12 of the lever 6 and the unbanking pin 14 rests upon an underlying portion of the periphery of the collet 9 for maintaining said lever against downward or return movement. The arrangement is such that at the instant said unbanking pin rides off said underlying portion of the collet, the force exerted by the jewel pin under the momentum of the balance wheel 7 acts through the lever 6 to depress the inner end of the latter, thus effecting forward rocking movement of the balance staff 8. The initial portion of this movement acts to disengage said outer end pawl of the pallet from the escape wheel and to simultaneously present the opposite end pawl of said pallet in the path of movement of the next tooth of said wheel, which latter is then forcibly advanced by the mainspring until said next tooth seats against the last mentioned pawl. The final part of the downward movement of said lever is thus actuated by energy imparted by the mainspring through the escape wheel 1 acting upon the released impulse pallet 4, and the impulse so given said lever acts to impart a strong impulse to the balance wheel through the intermediate jewel pin 10, collet 9 and balance staff 8. Then, with the oscillatory parts occupying substantially the positions shown in Fig. 3, the balance wheel rotates forward, carrying the jewel pin into the fork 13 with such force that its acts through the latter to elevate the inner end of the lever to the point at which the inner end pawl of the pallet is withdrawn from the thereby engaged tooth of the balance wheel. In so escaping from the escape wheel, the latter, impelled by the mainspring, imparts to said pallet a strong rocking force which is thence communicated through the rock-shaft and lever to the jewel pin as the latter leaves the fork 13, thus, through said pin, the collet and balance shaft, imparting a second impulse to said balance wheel.

While I have herein described the operation of the mechanism with the balance wheel rotating in the direction of the arrow, Fig. 1, it will be understood that said wheel may equally as well rotate in the opposite direction, and that, so rotated, the operation is substantially the same as hereinbefore described.

The rear end of the lever 6 operates between limit pins 15 and 16 which are carried by an adjacent frame member 17 in such positions as to positively limit the extent of the oscillating movements. The outer end of said lever is enlarged or otherwise weighted, as shown at 18, to approximately balance the inner end thereof.

From the foregoing it will be understood that two separate and distinct forward impulses are given the balance wheel at diametrically opposite points in each revolution of the latter; also, that the force or impetus of said balance wheel acts at two diametrically opposite points in each revolution to initiate the rocking movements of the pallet necessary to disengage the pawls of the pallet. Further, it will be seen that the balance wheel is continuously rotated in one direction, thus greatly reducing the energy required to maintain continuous operation over that required in ordinary oscillating types of balance wheels requiring the employment of hair springs, and also eliminating the vibration necessarily incident to such oscillating movements. As is manifest, the elimination of the usual hair spring is advantageous in that the ordinary annoyances attendant upon or incident to such spring are avoided.

What is claimed is—

1. A balance escapement comprising an escape wheel, a gear train for actuating said wheel, a pallet operatively associated with said wheel, a balance wheel, a pin in fixed relation to said balance wheel, and means intermediate said pallet and said pin whereby the balance wheel is actuated to rotate continuously and whereby said pallet is, in turn, initially actuated by said balance wheel, said means including forks alternately engageable with said pin.

2. A balance escapement comprising an escape wheel, a gear train for actuating said wheel, a pallet operatively associated with said wheel, a balance wheel, a balance staff by which said balance wheel is carried, a cam-like banking collet fixed on said staff, a jewel pin carried by said collet, and a lever associated with said pallet and alternately imparting impulses to and receiving pallet-actuating impulses from said balance wheel through said pin, said collet and said staff, said balance wheel being continuously rotated.

3. A balance escapement comprising, in combination with an escape wheel and means for driving said wheel, a pallet, an impulse lever carried in fixed relation to said pallet and having oppositely disposed forks, a continuously rotatable balance staff, a balance wheel carried by said staff, and means carried by said staff and engageable alternately with said forks whereby movements of said lever impart two separate impulses to said balance staff in each revolution of the latter.

4. A balance escapement comprising, in combination with an escape wheel and means for driving said wheel, a pallet, an impulse lever carried in fixed relation to said pallet and having a yoke formed on its inner end, a continuously rotatable balance staff, a balance wheel on said staff, a collet carried by said staff, a jewel pin carried eccentrically by said collet, and oppositely disposed forks carried by said yoke, said forks being adapted to assume operative engagement with said jewel pin at approximately diametrically opposite points in the rotary movement of the latter whereby two separate impulses are imparted thereby to the jewel pin for continuously rotating said balance wheel and whereby two separate initial impulses are imparted through said jewel pin to said lever for effecting rocking of said pallet.

5. A balance escapement comprising, in combination with an escape wheel and means for driving said wheel, a pallet, an impulse lever carried in fixed relation to said pallet and having a yoke formed on its inner end, a continuously rotatable balance staff, a balance wheel on said staff, a cam-like banking collet carried by said staff, an unbanking pin carried by said lever in cooperative relation to said collet, a jewel pin carried by said collet, and a pair of oppositely disposed forks carried by said yoke, said forks being adapted to alternately coact with said pin for imparting impulses to the latter whereby said balance wheel is continuously rotated and for receiving impulses from said pin whereby oscillating movements are imparted to said lever for effecting rocking of said pallet.

In testimony whereof, I affix my signature in presence of two subscribing witnesses.

JACOB B. BATES.

Witnesses:
W. N. BRADFORD,
H. E. DUNLAP.